March 1, 1960  TAKAYOSHI SATO  2,926,590
PHOTOGRAPHIC SHUTTER DEVICE
Filed March 3, 1959  4 Sheets-Sheet 1

INVENTOR.
T. Sato
ATTYS.

March 1, 1960  TAKAYOSHI SATO  2,926,590
PHOTOGRAPHIC SHUTTER DEVICE
Filed March 3, 1959  4 Sheets-Sheet 2

INVENTOR.
T. Sato

March 1, 1960  TAKAYOSHI SATO  2,926,590
PHOTOGRAPHIC SHUTTER DEVICE
Filed March 3, 1959  4 Sheets-Sheet 3

INVENTOR.
T. Sato
BY
ATTYS.

March 1, 1960 TAKAYOSHI SATO 2,926,590
PHOTOGRAPHIC SHUTTER DEVICE
Filed March 3, 1959 4 Sheets-Sheet 4
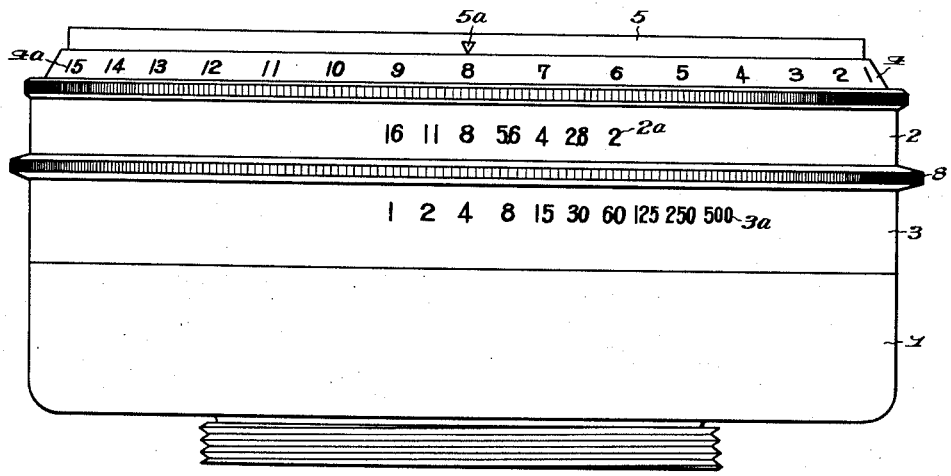
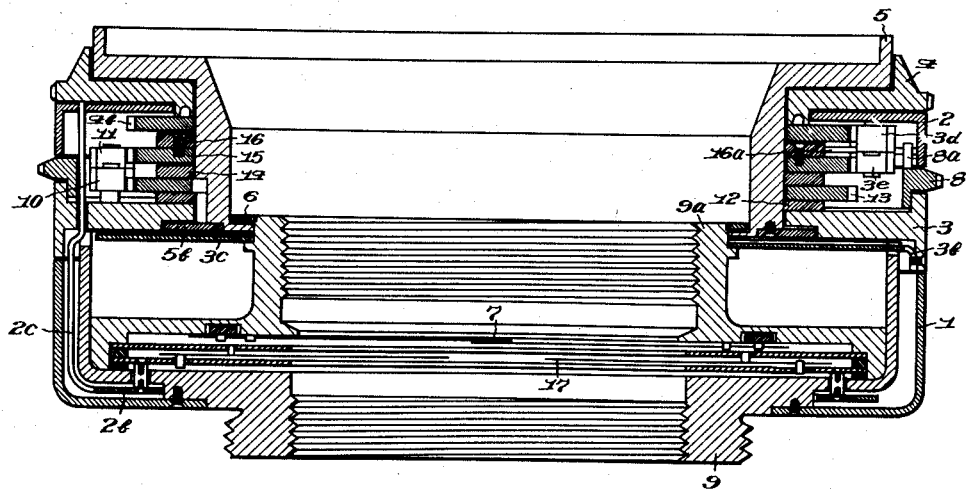
INVENTOR.
T. Sato

United States Patent Office 2,926,590
Patented Mar. 1, 1960

2,926,590

PHOTOGRAPHIC SHUTTER DEVICE

Takayoshi Sato, Tokyo-to, Japan, assignor to Kabushiki Kaisha Koparu Koki Seisakusho, Tokyo-to, Japan Application March 3, 1959, Serial No. 796,926

Claims priority, application Japan March 7, 1958

3 Claims. (Cl. 95—64)

The present invention relates to a photographic shutter device, and more particularly to a shutter device provided with an exposure value adjusting ring having an exposure value scale, said ring being coupled with the normal shutter speed and diaphragm adjusting rings by a gear train.

An object of the present invention is to provide an improved photographic shutter device, in which an exposure value adjusting ring, a shutter speed adjusting ring and a diaphragm adjusting ring are rotatably overlapped on the shutter casing and coupled with one another by gears, and in which when an exposure value adjusting ring is turned to make a predetermined exposure value of the exposure value scale coincide with the stationary pointer, combined determination of the correct shutter speed and diaphragm aperture is obtained according to the given exposure value.

Another object of the present invention is to provide a photographic shutter device, in which combined determination of the correct shutter speed and diaphragm aperture under a constant exposure value can be obtained by turning a coupling ring with a relatively small torque.

Said objects, other objects and novel features of the present invention will be apparent from the following detailed description, when taken together with the accompanying drawings, in which the same members are indicated by the same numerals and characters and in which:

Fig. 6 is a view similar to Fig. 2 for showing the other embodiment of the present invention; and Fig. 7 is a view similar to Fig. 3 for showing the embodiment of Fig. 6.

Figure 1:
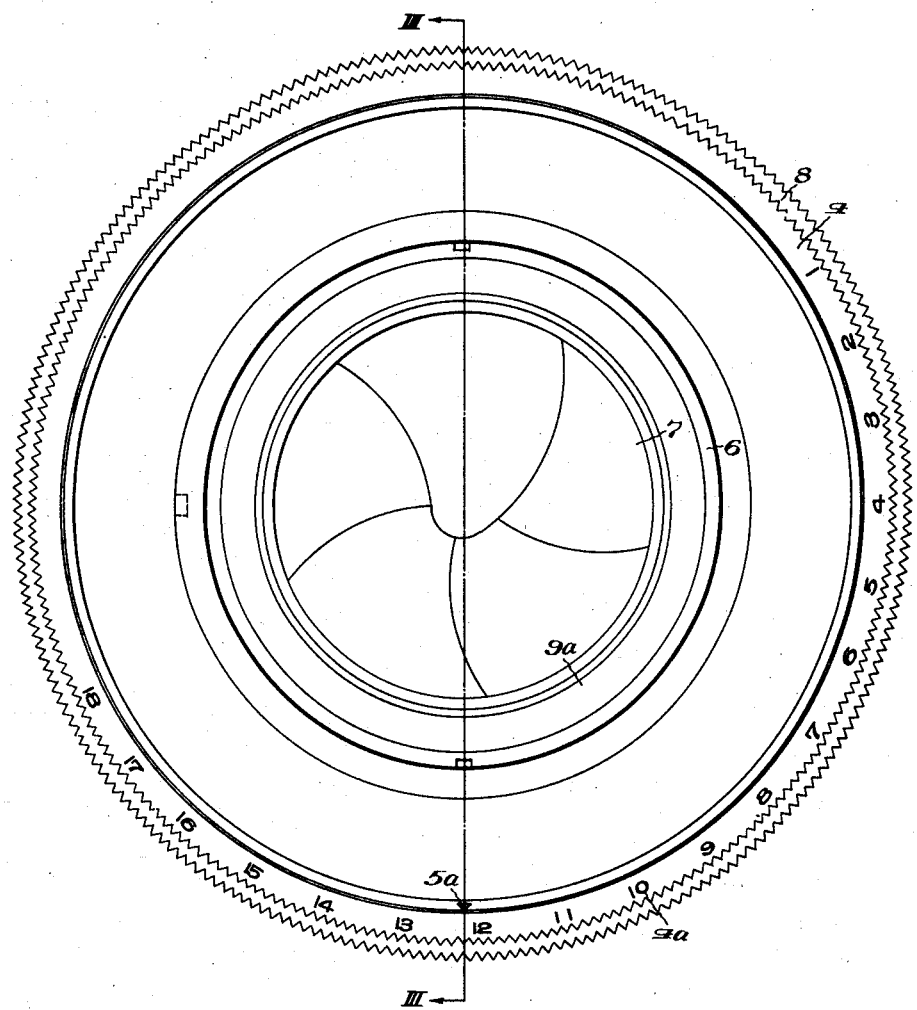
Fig. 1 is an enlarged front view of a photographic shutter device according to a preferred embodiment of the present invention.

Referring now to Figs. 1–5, the shutter device comprises a cover casing 1 fixed to a shutter housing 9 in which a shutter mechanism is located, shutter speed adjusting ring 3 supported rotatably around the optical axis of the shutter and bearing a speed scale 3a, and an exposure value adjusting ring 4 bearing an exposure value scale 4a for indicating the relationship between the above-mentioned exposure aperture and speed. The shutter mechanism is provided with shutter blades 7 of any suitable number (five blades being here shown) which are operated by a conventional shutter operating mechanism.

Figure 3:
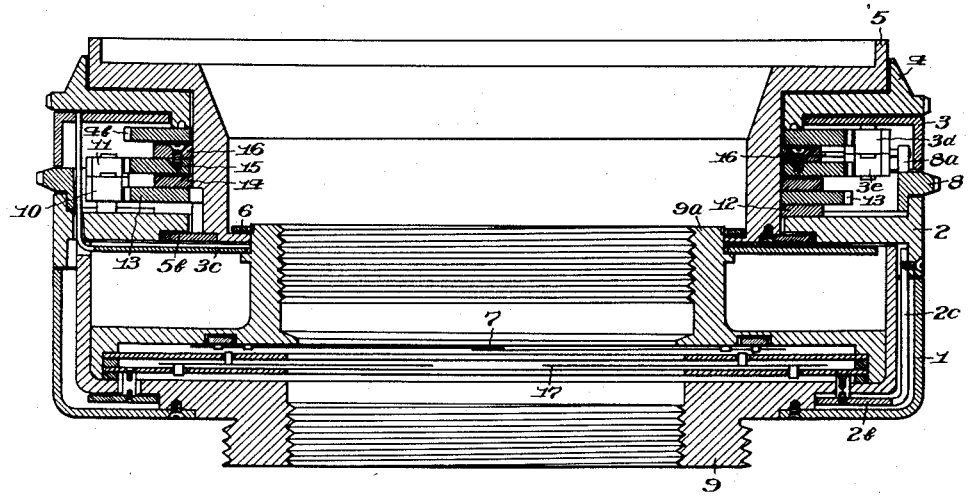
Fig. 3 is a diametral section taken along the line III—III of Fig. 1.
Figure 4:
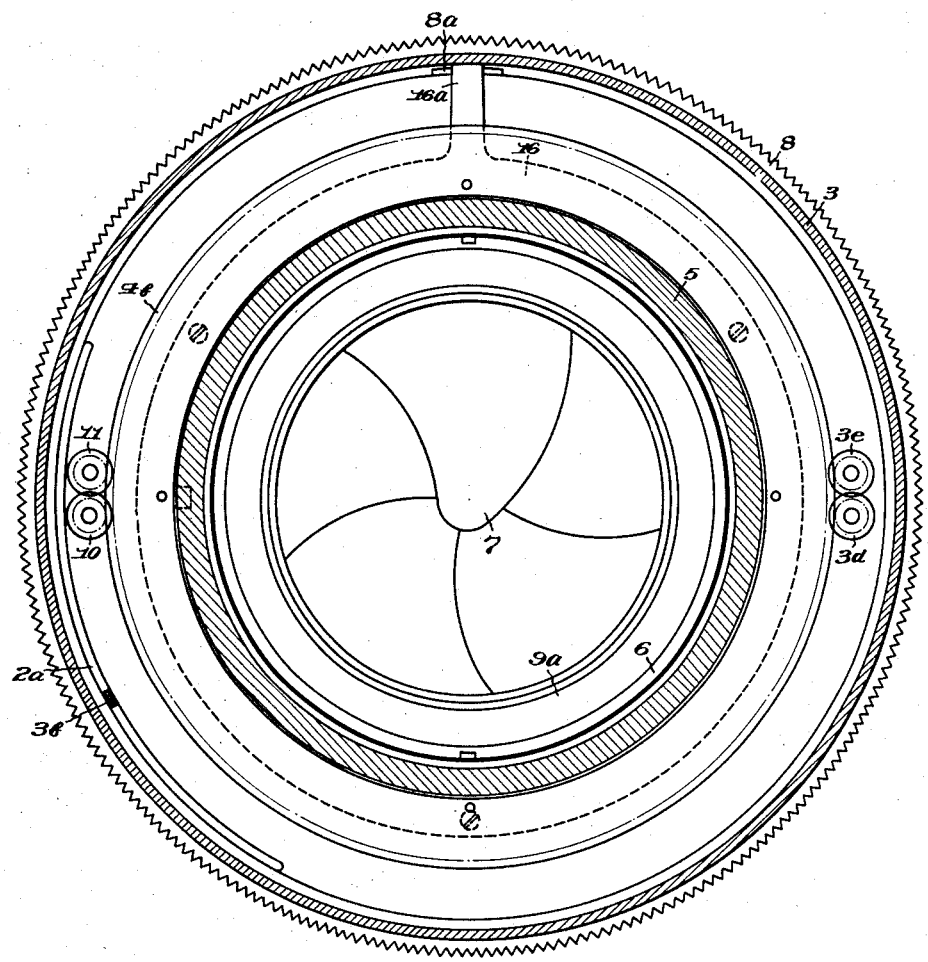
Fig. 4 is a section taken along the line IV—IV of Fig. 2.
Figure 5:
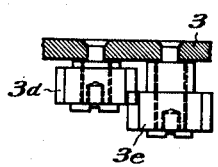
Fig. 5 is a fragmentary enlarged side view of the pinion gears 3c and 3d in Fig. 3.

As shown particularly in Fig. 3, the shutter mechanism is also provided with an iris diaphragm device comprising diaphragm leaves 17 which can be adjusted to various positions to vary the diameter of the exposure aperture, said leaves being of conventional form and being operated by a conventional rotatable adjusting ring 2b the operation and mechanism of which are omitted herewith, because they have no direct relation to the characteristic points of the present invention.

The shutter speed adjusting ring 3 bearing the speed scale 3a is fixed to a cam plate 3c by an arm 3b extending upward from said cam plate 3c as shown in Fig. 3, said cam plate 3c being operatively coupled with a shutter speed control device not particularly shown. The ring 3 supports the shaft of pinion gears 3d and 3e which are meshed with each other as particularly shown in Fig. 5, said pinion gear 3e being meshed with a ring gear 4b coupled rigidly with the exposure value adjusting ring 4 which is rotatably mounted around the cylindrical cover ring 5 bearing a stationary pointer 5a. This cylindrical cover ring 5 is fixed, by a ring nut 6, to a predetermined position of the objective lens cylinder together with the shutter casing 9.

The diaphragm adjusting ring 2 is rotatably mounted around said cylindrical cover ring 5 and coupled with a diaphragm operating ring 2b by an arm 2c extending upward from said ring 2b as shown in Fig. 3. Accordingly, the diaphragm leaves 17 can be adjusted to give an appropriate exposure aperture by turning the adjusting ring 2. On the other hand, the diaphragm adjusting ring 2 supports rotatably the pinion gears 10 and 11 which are meshed with each other and meshed, respectively with a stationary ring gear 13 and a rotary ring gear 15 which is unified with a washer 16 having a radial arm 16a. This washer 16 is operatively coupled with a coupling ring 8 by way of a lug 8a thereof and an arm 16a of the washer 16, said ring 8 being rotatably mounted on the diaphragm adjusting ring 2. Accordingly, the ring gear 15 is operatively coupled with the coupling ring 8, thus permitting said two rings to turn in the same direction as shown in Fig. 3. The washers 12 and 14 are loosely mounted around the cylindrical cover ring 5 to secure the smooth rotation of the ring gear 15 or the diaphragm adjusting ring 2.

In the mechanism illustrated in Figs. 1–5; if the exposure value adjusting ring 4 is stopped relative to the cylindrical cover ring 5 by such a click device as well known, but not shown in the drawings, the ring gear 4b is held by the cylindrical cover ring 5. In this status, for example when the coupling ring 8 is turned clockwise, the ring gear 15 is also turned clockwise together with the washer 16, whereby the pinion gears 3d and 3e are rotated around the ring gear 4b in the clockwise direction while being rotated about their shaft. Accordingly, the shutter speed adjusting ring 3 is turned clockwise the same as the coupling ring 8. On the other hand, the pinion gear 11 is driven by the ring gear 15 and the pinion gear 10 is rotated clockwise around the stationary ring gear 13 while being rotated around its shaft. Accordingly, the diaphragm adjusting ring 2 is turned clockwise the same as the coupling ring 8.

If the exposure value adjusting ring 4 is turned clockwise, the rotation of said ring 4 is successively transmitted to the pinion gears 3d and 3e, ring gear 15, and pinion gears 11 and 10, whereby the diaphragm adjusting ring 2 will be turned counterclockwise by the planetary motion of the pinion gear 10 relative to the stationary ring gear 13, because the speed adjusting ring 3 is stopped by the click device not shown at the normal state. In this manner, when said diaphragm adjusting ring 2 reaches to the extreme position, for example, to the position where the stationary pointer 5a coincides with the numeral 16 of the scale 2a in Fig. 2, the shutter speed adjusting ring 3 begins to rotate counterclockwise.

In the shutter device illustrated in Figs. 6 and 7, the diaphragm adjusting ring 2 is positioned at the front of the speed adjusting ring 3, and the scales of the shutter speed and diaphragm aperture are graduated in the reverse order. Accordingly, if the exposure value adjusting ring 4 is turned clockwise, the diaphragm adjusting ring 2 will be turned counterclockwise, because the shutter speed adjusting ring 3 is stopped by the click device not shown at the normal state. In this manner, when said diaphragm adjusting ring 2 reaches to the extreme position, for example, to the position where the stationary pointer 5a coincides with the numeral 16 of the scale 2a in Figs. 6 and 7, the shutter speed adjusting ring 3 begins to rotate clockwise. The shutter device illustrated in Figs. 6 and 7 is entirely same in the construction and operation as the device illustrated in Figs. 1–5 except the above-mentioned facts.

As will be seen from the above description and the gear mechanism in Figs. 3 and 7, if the number of teeth of the pinion gear 3e is selected to be equal to those of the pinion gears 3d, 10 and 11 and the number of teeth of the ring gear 13 is selected to be equal to those of the ring gears 15 and 4b, the speed adjusting ring 3 and the diaphragm adjusting ring 2 will be rotated to the same direction with an equal rotation angle $\theta$, on the other hand, the exposure value adjusting ring 4 will be rotated to said direction with a rotation angle twice as much as the above-mentioned rotation angle $\theta$. Accordingly, the graduation of the exposure value scale 4a is graduated with two-fold spaces of the shutter speed scale 3a or the diaphragm aperture scale 2a, as shown in Figs. 2 and 6.

Figure 2:
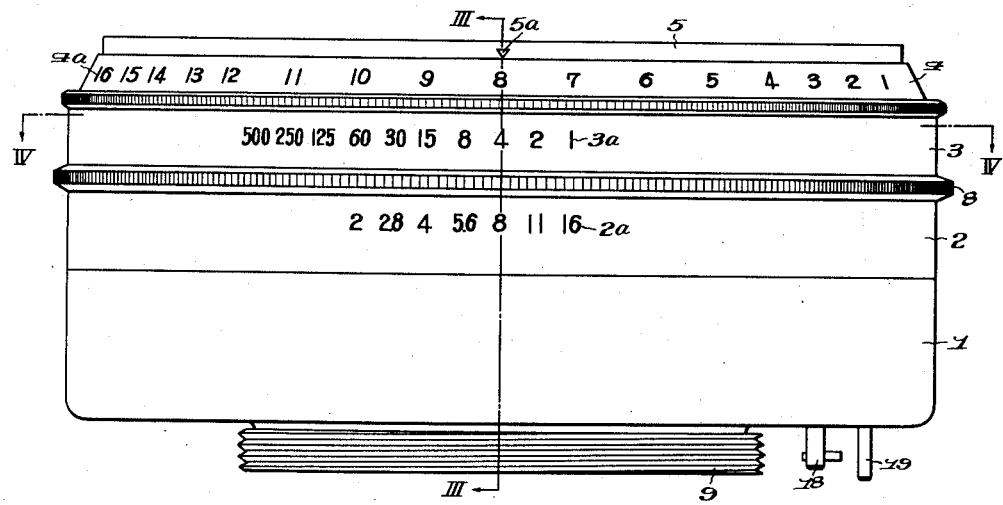
Fig. 2 is a side view for showing the relationship of the exposure value adjusting ring, the shutter speed adjusting ring and the diaphragm adjusting ring of the shutter device of Fig. 1.

In the case of taking a photograph of any object, the exposure value adjusting ring 4 is first rotated until the measured exposure value (for example exposure value numeral 8 as shown in Figs. 2 and 6) coincides with the stationary pointer 5a. At the same time as said rotation, the shutter speed adjusting ring 3 and the diaphragm adjusting ring 2 are also turned to the same direction. For example, the numerals 4 of the speed scale 3a and the numeral 8 of the diaphragm aperture scale 2a are made to coincide with the pointer 5a as shown in Figs. 2 and 6. Consequently, the shutter is set to give a correct exposure on the film. In this status, if necessary, the camera can be set again to a new combination of the suitable shutter speed and diaphragm aperture by operation of the coupling ring 8 under said predetermined exposure value.

It should be understood that while the present disclosure relates to preferred embodiments of the invention, it is intended to cover all changes and modifications of the embodiments of the invention herein chosen, without departing from the spirit and scope of the invention as set forth in the appended claims.

I claim:

1. A photographic shutter device comprising an annular housing having an exposure aperture therethrough, an exposure value adjusting ring having an accessible peripheral edge for manual grasping and turning, a shutter speed adjusting ring rigidly coupled with a speed adjusting cam plate, a diaphragm adjusting ring rigidly coupled with a diaphragm operating ring which is rotatably mounted on said housing at the rear portion thereof, and a coupling ring having an accessible peripheral edge for manual grasping and turning and capable of being operatively coupled with said shutter speed adjusting ring and said diaphragm adjusting ring, said exposure value adjusting ring having a ring gear rotatably mounted on the objective lens cylinder, said shutter speed adjusting ring supporting rotatably pinion gears which are meshed with each other and with said ring gear related to said exposure value adjusting ring and an intermediate ring gear which is rotatably mounted on said objective lens cylinder and adapted to engage with said coupling ring, respectively, and said diaphragm adjusting ring supporting rotatably pinion gears which are meshed with each other and with said intermediate ring gear and a ring gear rigidly connected to said objective lens cylinder, respectively.

2. A photographic shutter device as set forth in claim 1, wherein said diaphragm adjusting ring bearing a diaphragm aperture scale, said shutter speed adjusting ring bearing a shutter speed scale and said exposure value adjusting ring bearing an exposure value scale are rotatably overlapped in turn on the shutter housing.

3. A photographic shutter device as set forth in claim 1, wherein said shutter speed adjusting ring, said diaphragm adjusting ring and said exposure value adjusting ring are rotatably overlapped in turn on the shutter housing.

References Cited in the file of this patent

UNITED STATES PATENTS

| 2,887,937 | Gebele | May 26, 1959 |
| 2,889,761 | Gebele | June 9, 1959 |

FOREIGN PATENTS

| 756,693 | Great Britain | Sept. 5, 1956 |